US010776106B2

(12) United States Patent
Sahu et al.

(10) Patent No.: US 10,776,106 B2
(45) Date of Patent: Sep. 15, 2020

(54) METHOD AND SYSTEM FOR CODE ANALYSIS TO IDENTIFY CAUSES OF CODE SMELLS

(71) Applicant: Tata Consultancy Services Limited, Mumbai (IN)

(72) Inventors: Monika Sahu, Pune (IN); Kumar Mansukhlal Vidhani, Pune (IN); Sachin Premsukh Lodha, Pune (IN); Ram Kumar, Lakhisarai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/571,581

(22) Filed: Sep. 16, 2019

(65) Prior Publication Data

US 2020/0089491 A1    Mar. 19, 2020

(30) Foreign Application Priority Data

Sep. 14, 2018   (IN) .............................. 201821034796

(51) Int. Cl.
*G06F 8/75* (2018.01)
*G06F 8/71* (2018.01)

(52) U.S. Cl.
CPC . *G06F 8/75* (2013.01); *G06F 8/71* (2013.01)

(58) Field of Classification Search
CPC .................................... G06F 8/75; G06F 8/71
See application file for complete search history.

(56) References Cited

U.S. PATENT DOCUMENTS 9,760,473 B2 * 9/2017 Lee ..................... G06F 11/3664
2010/0269096 A1 * 10/2010 Araya ....................... G06F 8/71
717/113
(Continued)

FOREIGN PATENT DOCUMENTS

CN    108664269    10/2018

OTHER PUBLICATIONS

Sahin et al., "Code-Smell Detection as a Bilevel Problem" (Year: 2014).*

(Continued)

*Primary Examiner* — Phillip H Nguyen
(74) *Attorney, Agent, or Firm* — Finnegan, Henderson, Farabow, Garrett & Dunner, LLP (57) ABSTRACT

Identifying root cause of code smells is crucial in enabling proper and efficient software maintenance. Desired are computationally less intensive and easy to implement solutions. Embodiments herein provide a method and system for code analysis to identify causes of code smells. The method provides considerable automation during software maintenance by analyzing detected code smells of two subsequent versions of an application by categorizing the code smells, filtering significant code smells from the detected code smells, mapping the significant code smells between two versions, generating a customized PDG for the mapped functions and performing the isomorphic subgraph mapping for computing a function difference. The computed function difference provides added part of the code or removed part or region of the code of the application, which is cause of the significant added code smells, which can then be provided for manual analysis to identify the root causes for efficient software maintenance.

9 Claims, 8 Drawing Sheets

(56) References Cited

U.S. PATENT DOCUMENTS

2012/0060142 A1* 3/2012 Fliess ................. G06F 11/3428
717/102
2015/0100942 A1* 4/2015 Misbhauddin ............ G06F 8/72
717/104

OTHER PUBLICATIONS

Roy et al., "A Survey on Software Clone Detection Research" (Year: 2007).*
Sirikul et al., "Automated Detection of Code Smells Caused by Null Checking Conditions in Java Programs" (Year: 2016).*
Liu et al., "DT : a detection tool to automatically detect code smell in software project" (Year: 2016).*
Fontana et al., "Comparing and experimenting machine learning techniques for code smell detection" (Year: 2016).*
Palomba et al., "Mining Version Histories for Detecting Code Smells" (Year: 2015).*
Palomba et al., "Detecting Bad Smells in Source Code using Change History Information" (Year: 2013).*
Palomba, "Code Smells: Relevance of the Problem and Novel Detection Techniques" (Year: 2016).*
Henderson, T.A.D. et al. "Sampling Code Clones from Program Dependence Graphs with GRAPLE," *Proceeding SWAN 2016 Proceedings of the $2^{nd}$ International Workshop on Software Analytics*, Nov. 13, 2016, Seattle, WA; pp. 47-53.
Hamid, A. et al. "Detecting Refactorable Clones by Slicing Program Dependence Graphs," *SATToSE 2014: Proceedings of the Seventh Seminar on Advanced Techniques and Tools for Software Evolution*, Jul. 9-11, 2014, L'Aquila, Italy (13 pages).
Kamalpriya, C.M. (2016). *Enhancing Program Dependency Graph Based Clone Detection Using Approximate Subgraph Matching* (Master's dissertation). Retrieved from http://pvsingh.com/wp-content/uploads/2017/07/Kamalpriya.pdf (83 pages).

* cited by examiner

METHOD AND SYSTEM FOR CODE ANALYSIS TO IDENTIFY CAUSES OF CODE SMELLS

PRIORITY CLAIM

The present application claims priority from Indian patent application no. 201821034796, filed on Sep. 14, 2018, the complete disclosure of which, in its entirety, is herein incorporated by reference.

TECHNICAL FIELD

The disclosure herein generally relates to field of software maintenance and evolution, and, more particularly to identifying causes of code smell as software evolves.

BACKGROUND

Software evolution refers to changes made to a software and maintenance of the software. Changes to the software occur as organizational requirements change or a repair is required to fix errors or to improve performance and reliability. Further, software maintenance is required when changes are introduced in the software to adapt to a new environment, without any major change in the basic architecture. Over the life of modern software systems, the changes may involve simple changes to correct coding errors, more extensive change to correct design errors. Moreover, software bug fixes, enhancements, performance improvements, changing business requirement, design changes etc. require software system to have strong evolution capability. Sometimes, the evolution affects unintended part of the software, leading to maintaining the software system repeatedly. Code smells are anomalies often generated or injected in design, implementation or maintenance phase of a software development life cycle. As software evolves, changes in software lead to further maintenance activity. Study and analysis of how the software has evolved with respect to the baseline version of the software is crucial to understand.

A code smell is a surface indication that usually corresponds to a deeper problem in the software system, which is quick to spot or sniffable. A typical example of code smell is a long method. However, code smells may not always indicate a problem. For example, some long methods are just fine. Thus, it is necessary to look deeper to examine if there exists an underlying problem or root cause giving rise to the detected code smell. The code smells are not inherently bad on their own, they are often an indicator of a problem rather than the problem themselves. Thus, identifying the root causes of the code smell to the underlying system is essential to understand how the code smell is injected or removed.

During software maintenance, the incorrect understanding of the requirements, lack of experience in the software development process is expected to produce a code smell. An existing technique for software maintenance scans for software defect by employing code smell detection, clone detection and coupling detection technique. This technique utilizes probabilistic measures for software defect prediction, wherein the result is presented to the developer who takes the necessary step to fix such defects. The use of coupling based defect detection techniques might make the defect measure process complex if the dataset has higher coupling concentration in a smaller module of an application.

Some existing approaches rely on Machine Learning (ML) algorithms in order to help software developer to find cost oriented possible changes to source code. However, ML based techniques are computationally expensive due to complex data models. Further, the ML based techniques are time consuming and often accuracy can be a concern. Additionally, ML based code smell detection technique also demands some manual annotation, in order to provide a training set for the machine learning techniques. Aforementioned techniques essentially focus on software defects, not on code smells. Some existing ML based code techniques focus on only one type of code smell detection, such as attachment feature and do not provide a generalized approach capturing all types of code smells. An existing method focusses on detecting preventive maintenance in software source code. Preventive maintenance is the modification of a software product after delivery to detect and correct potential faults in the software product before they become effective faults. This existing method comprises analyzing of source code for two versions of software, defining data sets associated with the characteristic of source code. Further, the data sets are analyzed to find the occurrence of preventive maintenance performed on the source code. However, the existing approach above is not based on program dependence graph, wherein program dependence graph are oblivious to semantics preserving statement re-orderings and hence are well suited to detect semantic (functionally equivalent) clones. Moreover, the standard PDG-based clone detection tools are able to detect only certain clones but have limitation to detect all clones that may be present. Standard PDGs simply approximate semantic dependencies between statements.

SUMMARY

Embodiments of the present disclosure present technological improvements as solutions to one or more of the above-mentioned technical problems recognized by the inventors in conventional systems. For example, in one embodiment, a method for code analysis to identify causes of code smells is provided. The method comprises detecting the code smells in a first version of an application and a second version of the application using a code smell detection technique. The detected code smells in the first version are stored in a first eXtensible Markup Language) (XML) file and the detected code smells in the second version are stored in a second XML file. Further, the method comprises comparing the first XML file with second XML file using a XML-difference technique, to classify each code smell among the detected code smells of the first version and the second version of the application to a category among a plurality of categories. The plurality of categories comprise common code smells, added code smells and removed code smells. The common code smells are code smells detected in the first version and the second version, and are tagged as least significant code smells; the added code smells are code smells detected in the second version and absent in the first version. The added code smells correspond to at least one of new module additions and modifications to existing functions of the first version of the application, wherein the added code smells associated with the modifications to the existing function of the first version of the application are tagged as significant added code smells. The removed code smells are code smells detected in the first version and absent in the second version, wherein the removed code smells correspond to at least one of removal of an existing module and partial removal of code from the existing functions of the first version of the application, wherein the removed code smells associated with the partial removal of code from the existing functions of the first version of the application are tagged as significant removed code smells. Further, the method comprises mapping from the first XML file of the first version and the second XML file of the second version, files that are associated with the significant added code smells or the significant removed code smells to generate a plurality of pairs of mapped functions corresponding to the significant added code smells or the significant removed code smells of the first version and the second version. Furthermore, the method comprises generating a customized Program Dependence Graph (PDG) of each pair among the plurality of pairs of the mapped functions to determine data dependencies and control dependencies for each pair. Furthermore, the method comprises performing an isomorphic sub-graph mapping on the customized PDG of each pair to identify a similar code in a code associated with each pair. The isomorphic sub-graph mapping on the customized PDG considers a syntactic structure and data flow of the code associated with each pair to generate n-ary tree for each mapped function in each pair by performing edge splitting into equivalence classes, wherein each node of each n-ary tree comprises two child nodes with a left child node as data dependency and a right child node as control dependency; and to perform node comparison and node to node mapping on the generated n-ary trees for each mapped function by comparing corresponding tree vertices to match maximum vertices to determine mapped vertices between the generated n-ary trees. Furthermore, the method comprises computing a function difference between each mapped function of each pair. The function difference comprises at least one of: added part of the code, which is cause of the significant added code smells, wherein the added part of the code is obtained by eliminating matched vertices from the second version; and removed part of the code, which is cause of the significant removed code smells, where the removed part of the code is obtained by eliminating the matched vertices of function from the first version, wherein the computed function difference is analyzed further to identify root causes of the code smells.

In another aspect, a system for code analysis to identify causes of code smells is provided. The system comprises a memory storing instructions; one or more Input/Output (I/O) interfaces; and processor(s) coupled to the memory via the one or more I/O interfaces, wherein the processor(s) is configured by the instructions to detect the code smells in a first version of an application and a second version of the application using a code smell detection technique. The detected code smells in the first version are stored in a first eXtensible Markup Language (XML) file and the detected code smells in the second version are stored in a second XML file. Further, the processor is configured to compare the first XML file with second XML file using a XML-difference technique, to classify each code smell among the detected code smells of the first version and the second version of the application to a category among a plurality of categories. The plurality of categories comprise common code smells, added code smells and removed code smells. The common code smells are code smells detected in the first version and the second version, and are tagged as least significant code smells; the added code smells are code smells detected in the second version and absent in the first version. The added code smells correspond to at least one of new module additions and modifications to existing functions of the application, wherein the added code smells associated with the modifications to the existing function of the application are tagged as significant added code smells. The removed code smells are code smells detected in the first version and absent in the second version, wherein the removed code smells correspond to at least one of removal of an existing module and partial removal of code from the existing functions of the first version of the application, wherein the removed code smells associated with the partial removal of code from the existing functions of the first version of the application are tagged as significant removed code smells. Further, the processor is configured to map from the first XML file of the first version and the second XML file of the second version, files that are associated with the significant added code smells or the significant removed code smells to generate a plurality of pairs of mapped functions corresponding to the significant added code smells or the significant removed code smells of the first version and the second version. Furthermore, the processor is configured to generate a customized Program Dependence Graph (PDG) of each pair among the plurality of pairs of the mapped functions to determine data dependencies and control dependencies for each pair. Furthermore, the processor is configured to perform an isomorphic sub-graph mapping on the customized PDG of each pair to identify a similar code in a code associated with each pair. The isomorphic sub-graph mapping on the customized PDG considers a syntactic structure and data flow of the code associated with each pair to generate n-ary tree for each mapped function in each pair by performing edge splitting into equivalence classes, wherein each node of each n-ary tree comprises two child nodes with a left child node as data dependency and a right child node as control dependency; and to perform node comparison and node to node mapping on the generated n-ary trees for each mapped function by comparing corresponding tree vertices to match maximum vertices to determine mapped vertices between the generated n-ary trees. Further, the processor is configured to compute a function difference between each mapped function of each pair. The function difference comprises at least one of: added part of the code, which is cause of the significant added code smells, wherein the added part of the code is obtained by eliminating matched vertices from the second version; and removed part of the code, which is cause of the significant removed code smells, where the removed part of the code is obtained by eliminating the matched vertices of function from the first version, wherein the computed function difference is analyzed further to identify root causes of the code smells.

In yet another aspect, there are provided one or more non-transitory machine readable information storage mediums comprising one or more instructions, which when executed by one or more hardware processors causes a method for code analysis to identify causes of code smells. The method comprises detecting the code smells in a first version of an application and a second version of the application using a code smell detection technique. The detected code smells in the first version are stored in a first eXtensible Markup Language (XML) file and the detected code smells in the second version are stored in a second XML file. Further, the method comprises comparing the first XML file with second XML file using a XML-difference technique, to classify each code smell among the detected code smells of the first version and the second version of the application to a category among a plurality of categories. The plurality of categories comprise common code smells, added code smells and removed code smells. The common code smells are code smells detected in the first version and the second version, and are tagged as least significant code smells; the added code smells are code smells detected in the second version and absent in the first version. The added code smells correspond to at least one of new module additions and modifications to existing functions of the first version of the application, wherein the added code smells associated with the modifications to the existing function of the first version of the application are tagged as significant added code smells. The removed code smells are code smells detected in the first version and absent in the second version, wherein the removed code smells correspond to at least one of removal of an existing module and partial removal of code from the existing functions of the first version of the application, wherein the removed code smells associated with the partial removal of code from the existing functions of the first version of the application are tagged as significant removed code smells. Further, the method comprises mapping from the first XML file of the first version and the second XML file of the second version, files that are associated with the significant added code smells or the significant removed code smells to generate a plurality of pairs of mapped functions corresponding to the significant added code smells or the significant removed code smells of the first version and the second version. Furthermore, the method comprises generating a customized Program Dependence Graph (PDG) of each pair among the plurality of pairs of the mapped functions to determine data dependencies and control dependencies for each pair. Furthermore, the method comprises performing an isomorphic sub-graph mapping on the customized PDG of each pair to identify a similar code in a code associated with each pair. The isomorphic sub-graph mapping on the customized PDG considers a syntactic structure and data flow of the code associated with each pair to generate n-ary tree for each mapped function in each pair by performing edge splitting into equivalence classes, wherein each node of each n-ary tree comprises two child nodes with a left child node as data dependency and a right child node as control dependency; and to perform node comparison and node to node mapping on the generated n-ary trees for each mapped function by comparing corresponding tree vertices to match maximum vertices to determine mapped vertices between the generated n-ary trees. Furthermore, the method comprises computing a function difference between each mapped function of each pair. The function difference comprises at least one of: added part of the code, which is cause of the significant added code smells, wherein the added part of the code is obtained by eliminating matched vertices from the second version; and removed part of the code, which is cause of the significant removed code smells, where the removed part of the code is obtained by eliminating the matched vertices of function from the first version, wherein the computed function difference is analyzed further to identify root causes of the code smells.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As described above, a code smell is a surface indication that usually corresponds to a deeper problem in the software system, which is quick to spot or sniffable. A valid example of this is a long method. However, code smells may not always indicate a problem. For example, some long methods are just fine. Thus, it is necessary to look deeper to examine if there exists an underlying problem or root cause giving rise to the detected code smell. The code smells are not inherently bad on their own, they are often an indicator of a problem rather than the problem themselves. Thus, identifying root cause of the code smells by analyzing the code smells to focus on right part of code causing the problem is crucial in enabling proper and efficient software maintenance.

The embodiments herein provide a method and system for code analysis to identify causes of code smells. The method provides considerable automation during software maintenance as software evolves. The method comprises analyzing the detected code smells of two subsequent versions of an application by categorizing the code smells, identifying or filtering significant code smells from the detected code smells, mapping the significant code smells between two versions, generating a customized program dependence graph (PDG) for the mapped functions, performing the isomorphic subgraph mapping for computing a function difference. The computed function difference provides added part of the code or removed part or region of the code of the application, which is cause of the significant added code smells. This computed function difference can then be displayed or presented to subject matter experts for further manual analysis to identify the root causes for efficient software maintenance. In an example, the term application, referred herein for comparison of two subsequent versions of an application, can be a source code with two versions of the source code been compared for code smell causes.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Figure 1:
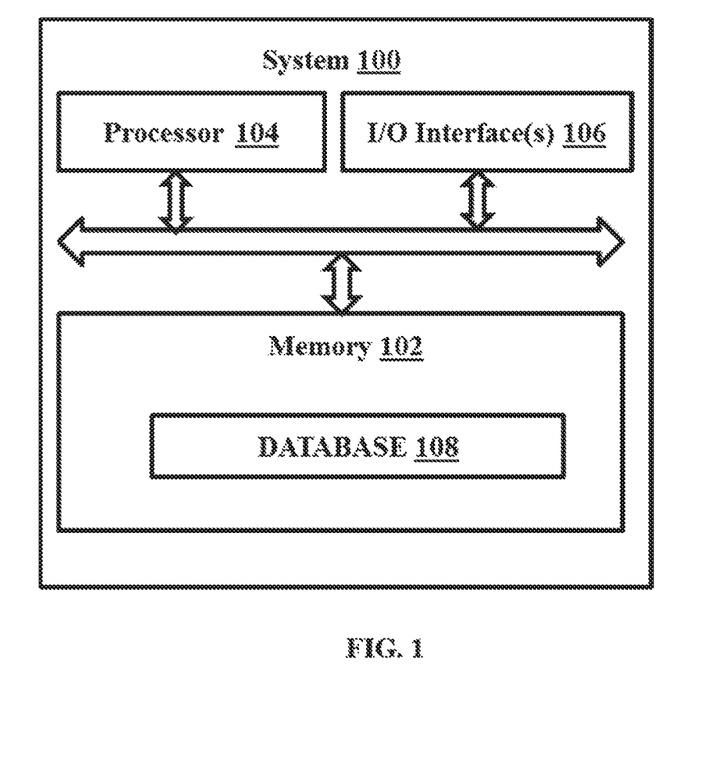
FIG. 1 is a functional block diagram of a system for code analysis to identify causes of code smells, in accordance with some embodiments of the present disclosure.

FIG. 1 is a functional block diagram of a system for code analysis to identify causes of code smells, in accordance with some embodiments of the present disclosure.

In an embodiment, the system 100 includes a processor 104, communication interface device(s), alternatively referred as or input/output (I/O) interface(s) 106, and one or more data storage devices or memory 102 operatively coupled to the processor 104. The processor 104, alternatively referred as processor(s), can be one or more hardware processors. In an embodiment, the one or more hardware processors can be implemented as one or more microprocessors, microcomputers, microcontrollers, digital signal processors, central processing units, state machines, logic circuitries, and/or any devices that manipulate signals based on operational instructions. Among other capabilities, the processor 104 is configured to fetch and execute computer-readable instructions stored in a memory 102. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106 provides interface to receive subsequent versions of the application to be analyzed for causes of the code smells present in the application. The versions of the applications and a plurality of application to be analyzed may be received via the I/O interfaces from one or more external resources (not shown). Further, the I/O interface enables communication or displaying the computed function differences to the subject matter expert for further analysis and identifying the root causes of code smells. In an embodiment, the plurality of the applications and the subsequent version can be stored by the system 100 into a database 108 of the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102, herein may include and represent distributed database sets of the distributed computing environment, in which system 100 may be implemented.

Thus, the memory 102 may comprise information pertaining to input(s)/output(s) of each step performed by the processor(s) 104 of the system 100 and methods of the present disclosure. For example herein, the memory 102 may store the detected code smells of two subsequent versions of the application, identified or filtered significant code smells, mapped the significant code smells between two versions, generating a customized program dependence graph (PDG) for the mapped functions, performing the isomorphic subgraph mapping for computing a function difference.

Figure 2A:
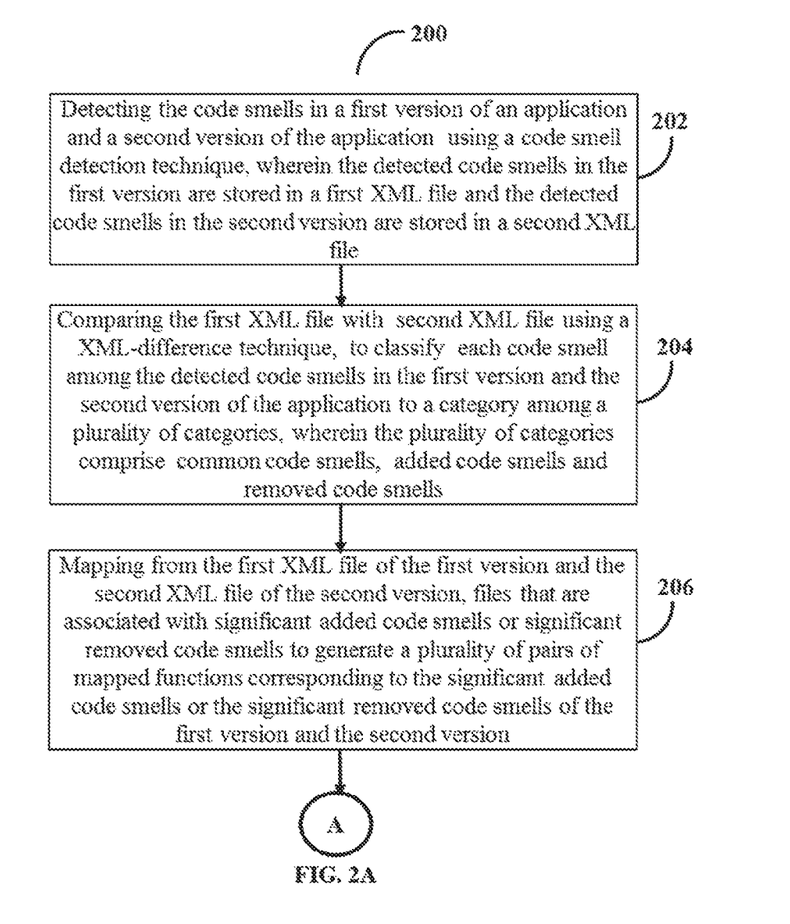
FIG. 2A and FIG. 2B are a flow diagram illustrating a method for code analysis to identify causes of code smells using the system of FIG. 1, in accordance with some embodiments of the present disclosure.
Figure 2B:
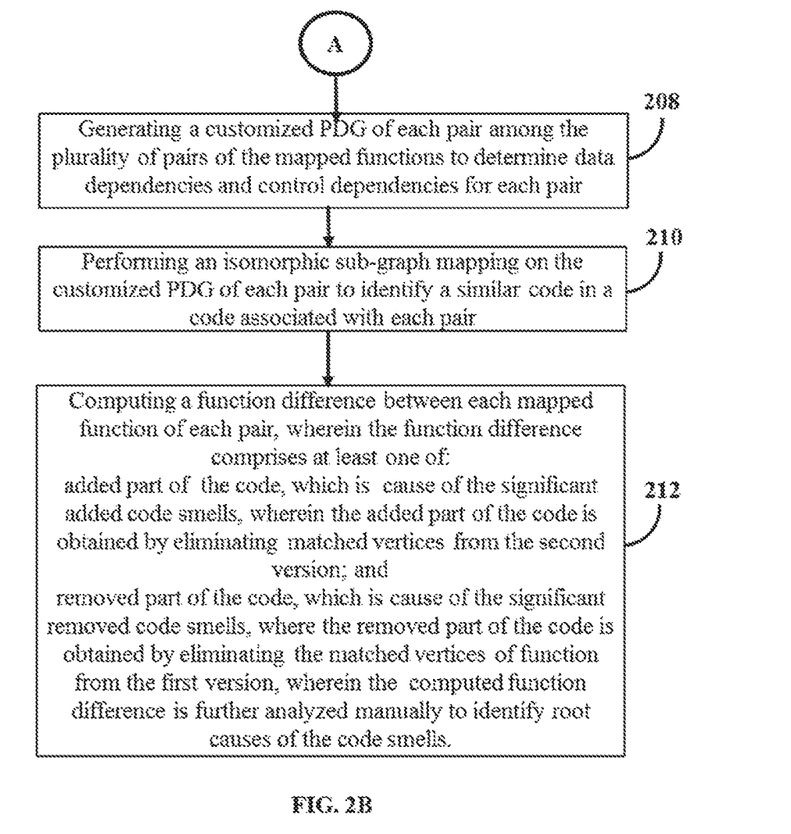

FIG. 2A and FIG. 2B is a flow diagram illustrating a method for code analysis to identify causes of code smells using the system of FIG. 1, in accordance with some embodiments of the present disclosure.

In an embodiment, the system 100 comprises one or more data storage devices or the memory 102 operatively coupled to a processor 104 and is configured to store instructions for execution of steps of the method 200 by the processor 104. The processor 104, in one embodiment can represent one or more hardware processors. The steps of the method 200 of the present disclosure will now be explained with reference to the components or blocks of the system 100 as depicted in FIG. 1 and the steps of flow diagram as depicted in FIGS. 2A and 2B along with examples illustrations in FIG. 3 through FIG. 7. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3:
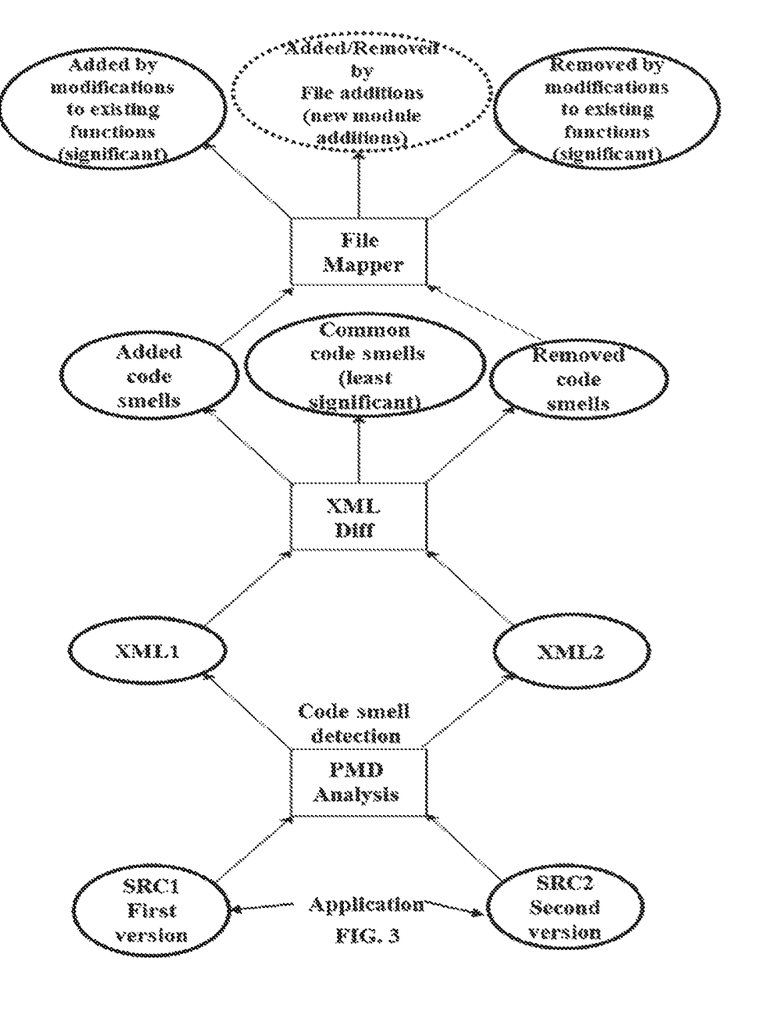
FIG. 3 illustrates an example XML diff and file mapper in conjunction with the method of FIG. 2A and FIG. 2B and in accordance with some embodiments of the present disclosure.

Referring to the steps of the method 200, at step 202, the processor 104 is configured as depicted in FIG. 3 to detect the code smells in a first version of an application and a second version of the application using a code smell detection technique. The detected code smells in the first version are stored in a first eXtensible Markup Language) (XML) file and the detected code smells in the second version are stored in a second XML file. The method disclosed utilizes the code smell detection technique or tool, which is selected based on an empirical study as reported by one of the literature. According to results reported by this literature, a best performing tool based on its precision and recall is selected. This tool employs a metric-based approach for classifying different nodes (Classes, Functions or Operations) as having a certain code smell. This tool runs on two version of the same software and detection results are detailed in XML files.

At step 204 of the method 200, the processor (104) is configured to compare the first XML file with second XML file using a XML-difference technique. The comparison enables to classify each code smell among the detected code smells of the first version and the second version of the application to a category among the plurality of categories. The plurality of categories comprises common code smells, added code smells and removed code smells. The categorization of code smells is depicted with an example illustration in FIG. 3.

a. The common code smells are code smells detected in the first version and the second version and are tagged as least significant code smells. The common code smells, interchangeably referred as common violations, are not very helpful as they essentially indicate that no significant change has been made to the application. Although borderline cases may exist, they can be further captured when further newer versions of the application are analyzed.

b. The added code smells are code smells detected in the second version and absent in the first version. The added code smells, interchangeably referred as added violations, correspond to either new module additions or modifications to existing functions of the first version of the application to modify the application to second version. Thus, the added violations can imply two reasons. One, entirely new module has been added to extend software functionality that contains code smells or smelly functions. In this case, it cannot be concluded on what code changes led to the code smell, since there does not exists a base case to compare. Hence, such added code smells associated with the new module additions are not eligible for offering insight into the incremental evolution of any software system and hence are not identified as significant added coded smells or simply significant code smells. Second, an existing class or function has been modified. In this case, analysis of the difference between these two classes or functions and reason about the injected/removed code smell and we can draw various inferences using this diff that can give us better insight and can help us in eliminating this smell. Hence the second type of added code smells are tagged as significant added code smells.

c. The removed code smells are code smells detected in the first version and absent in the second version. The removed code smells correspond to removal of an existing module or partial removal of code from the existing functions of the first version of the application to modify the application to second version. As discussed in the added code smells, similar case exists with the removed code smells, interchangeably referred as removed violations. The removed code smells may be present because of a file getting removed or some chunk of codes getting removed from the existing file. Since there does not exist any base or reference to analyze the file getting removed it is not significant for further analysis. However, partial removal of the code from the existing functions of the application such as the example where some chunk of codes are removed from the existing file can be compared with the base version, and hence are tagged as significant removed code smells.

Once the code smells are categorized and significant code smells identified in both version that are compared, then at step 206 of the method 200, the processor 104 is configured to map, from the first XML file of the first version and the second XML file of the second version, files that are associated with the significant added code smells or the significant removed code smells. The mapping enables to generate a plurality of pairs of mapped functions corresponding to the significant added code smells or the significant removed code smells of the first version and the second version. Mapped files or the mapped functions are eligible to compare against each other. In the context of the method disclosed, the mapped files help to map functions for the respective file. Therefore, mapping performed may be at various granularity levels ranging from more coarse-grained element, such as files, to more fine-grained elements, such as functions. The file level granularity is sufficient to detect some of the code smells defined in literature. Many of them describe method-level behavior for instance Feature envy or Divergant change. Hence, it is important to consider fine-grained changes as well for each pair of subsequent application code.

Once mapped functions are obtained, at step 208 of the method 200, the processor 104 is configured to generate the customized Program Dependence Graph (PDG) of each pair among the plurality of pairs of the mapped functions to determine data dependencies and control dependencies for each pair. The customized PDG is constructed using an Intermediate Representation (IR) of a mapped function associated with each pair. The customized PDG comprises a program statement or predicate as a vertex, edge label as a relation between two vertices of the PDG, a vertex type as tags associated with each vertex describing behavior of each vertex. The edges of the PDG depict one of data dependency, control dependency, falls through or combine false through. Program Dependence Graph can be of various types based on the granularity. For instance, source code statement level PDG as depicted in example of FIG. 4, Intermediate level PDG as depicted in example of FIG. 5 and fine-grained PDG in FIG. 7, with each statement further represented as AST (Abstract Syntax Tree).

Figure 4:
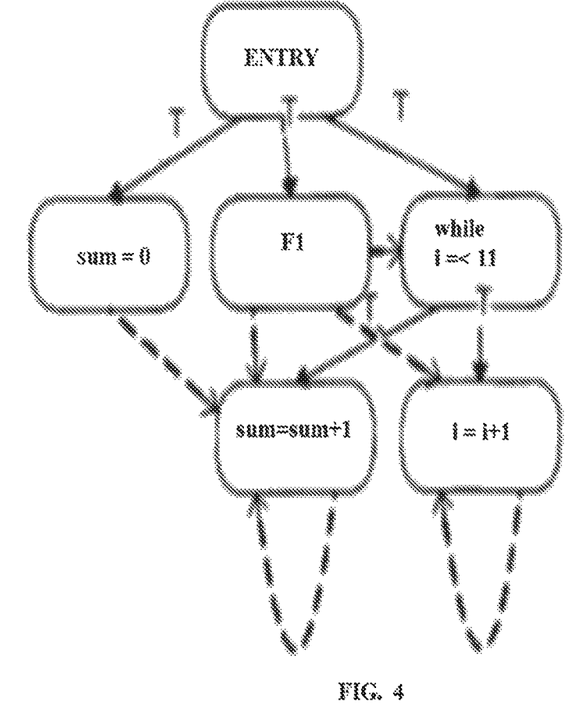
FIG. 4 illustrates an example source code level Program dependence Graph (PDG) in conjunction with the method of FIG. 2A and FIG. 2B and in accordance with some embodiments of the present disclosure.

An example source code for which the source code statement level PDG of FIG. 4 is generated as provided by Code Fragment-1 below:

---
Code Fragment-1
---
```
void sum( )
{
    inti, sum;
    sum = 0;
    i = 1;
    while ( i < 11 )
    {
        sum = sum + i;
        i = i + 1;
    }
}
```
---

In Source Code Statement level PDG as depicted in FIG. 4, a single line of source code forms one node. Edges represent data and control dependence between these nodes.

Figure 5:
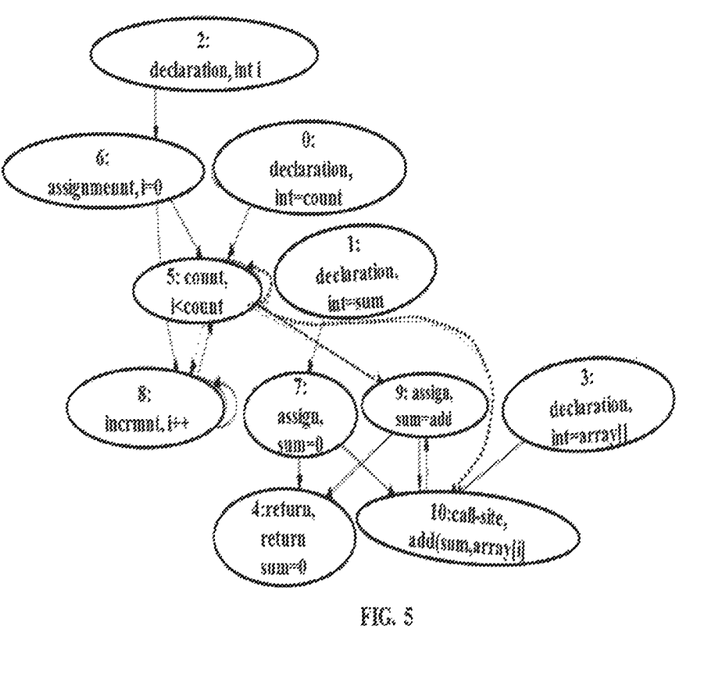
FIG. 5 illustrates an example Intermediate Representations (IR) level tagged PDG in conjunction with the method of FIG. 2A and FIG. 2B and in accordance with some embodiments of the present disclosure.

Another example source code of a procedure sum for summation over an array for which the IR level PDG of FIG. 5 is generated as provided by Code Fragment-2 below:

---
Code Fragment-2
---
```
int sum ( int array[ ], int count)
{
    inti, sum;
    sum=0;
    for ( i = 0; i < count; i++)
    {
        sum=add(sum, array[i]);
    }
    int add ( int a, int b)
    {
        return (a+b);
    }
}
```
---

An Intermediate Level PDG as depicted in FIG. 5, where Intermediate Representation (IR) statement will form one node. Edges would be connected based on the data and control dependencies among them. For the given example source code data dependency is represented by solid lines and control dependency is represented by dotted lines.

Figure 7:
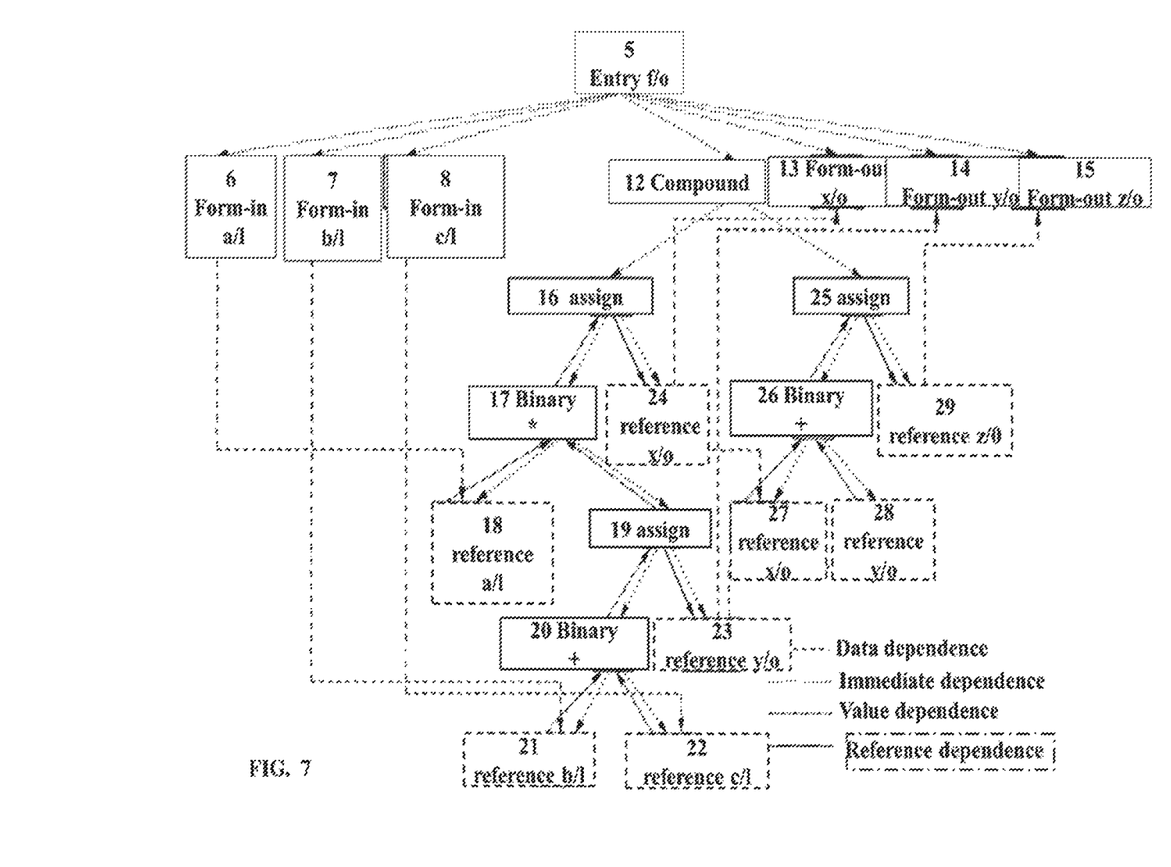
FIG. 7 illustrates an example Subgraph Matching technique in conjunction with the method of FIG. 2A and FIG. 2B and in accordance with some embodiments of the present disclosure.

The example source code for which the fine-grained PDG of FIG. 7 is generated as provided by Code Fragment-3 below:

| Code Fragment-3 |
|---|
| void f (int a, int b, int c)<br>{<br>    x = a * (y = (b + c ));<br>    z = x + y;<br>} |

In fine-grained PDG as depicted in FIG. 7, the IR representation of the source code statements i.e. the content of the node is further expanded in the form of AST (Abstract Syntax Tree). Based on this expansion the edges would be created for data dependence, immediate dependence, value dependence and reference dependence. However, fine-grained PDG or statement level PDG is not supported by existing static analysis frameworks. The reason being the method disclosed herein utilizes Intermediate Representation (IR) to operate on function body and its directed graph. Thus the PDG provided by one of the static analysis frameworks available for generating PDGs is not directly applicable and suitable to be used by the method disclosed herein. The PDG provided by the existing framework clubs together falls through statements (Program statement in IR). This leads to an issue of more than one program statements becoming part of a vertex. Even though the resulting PDG is compact, the cost of compactness is a significant information loss as individual program statements cannot be analyzed. Therefore, the method disclosed constructs the customized PDG using the reaching definition and control dependency analysis. A traditional reaching definition analysis practices a graph-theoretic concept of reaching by declaring that a definition reaches a use if there is some path in the control flow graph from the definition leading to the use that includes no intervening definition of the same variable. This definition of reaching is a conservative approximation.

Figure 6:
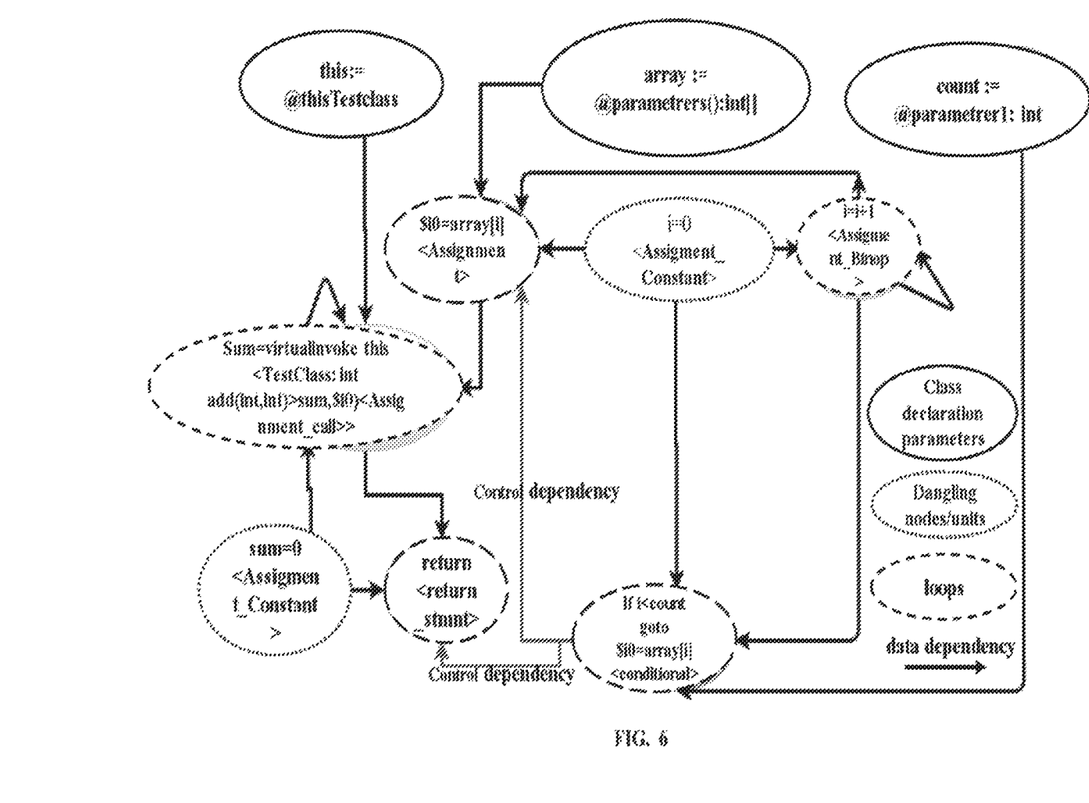
FIG. 6 illustrates an example Customized PDG in conjunction with the method of FIG. 2A and FIG. 2B and in accordance with some embodiments of the present disclosure.

FIG. 6 illustrates an example Customized PDG for the previously shown Code Fragment-2 IR level PDG. It depicts the dependency between program statements and separates out the program statement which does not depend on any other program statement. As stated previously PDGs approximate semantic dependencies between statements. They are not influenced by reordering statements in ways which preserve the semantics. Some study even showed that, under certain hypotheses, if the PDGs of two programs are isomorphic then the programs are equivalent. Overall, the PDG is a good representation to detect code clones with renamed variables, semantics-preserving statement reordering, and unrelated code insertions. As understood, the customized PDG is a directed attributed graph whose vertices represent the programs statements and edges represent dependencies between them. For example, a vertex may have an attribute that labels it as an entry vertex, have an attribute that labels them as entry vertices, which represent the entry of a function. Data dependences have been used to represent only the relevant data flow relationships in a program. Control dependence is introduced to analogously represent only the essential control flow relationships in a program. More specifically, a control dependence edge from vertex v1 to v2 represents that the execution of v2 vertex at runtime depends on the predicate of vertex v1. A data dependence edge from vertex v1 to v2 represents that the program statement represented by v1 assigns a value to a variable which may be used at the program statement represented by v2.

The features added over existing PDG generation techniques to generate the customized PDG are disclosed. Existing approaches for subgraph matching usually work on non-cyclic PDG or matching subgraph for cycle-free paths. Thus, the method disclosed deals with all back edges that are responsible for introducing cycles by disregarding the back edges. However, to disregard the back edges, line numbers of function units are necessary to be obtained. The line number tag provided by the static analysis framework gives source code line number and the IR of the existing framework can compose multiple lines for a single source code line. Thus, the method disclosed provides its new numbering for IR program statement by iterating over IR function body.

Once the customized PDGs are generated for each pair of methods, at step 210 of the method 200, the processor 104 is configured to perform an isomorphic sub-graph mapping on the customized PDG of a pair of methods to identify a similar code in them. The isomorphic sub-graph mapping on the customized PDGs examines the syntactic structure and data flow of the code associated with each pair of methods. Syntactic structure and data flows are utilized to generate n-ary tree for each method of a pair by performing edge partition into equivalence classes. Wherein each node, program statement in n-ary tree comprises of two child nodes with a left child node as data dependency and a right child node as control dependency. Further, node comparison and node to node mapping on the generated n-ary trees for each pair of methods is performed. This mapping is achieved through comparing corresponding tree vertices of two candidate n-ary trees and matching maximum possible vertices An example of FIG. 7 shows the portion of the PDG of a method with node numbering. To identify the equivalence between a pair of candidate nodes it is required to verify if both share the same attributes in terms of the number of vertices and node type based on the type of program statements such as assignment program statement, call program statement. As shown in FIG. 7, node 2, 3 and 4 in the first subgraph are equivalent to node 11, 12 and 13 in the second subgraph. The method disclosed utilizes an approach to find the isomorphic subgraph based on program dependence graphs and therefore considers not only the syntactic structure of programs but also the data flow within. The approach comprises of two steps:

a. Edge Splitting into Equivalence Classes: This approach begins by partitioning the incident edges on node in PDGs into two equivalent classes (data dependence and control dependence) based on the edge labels. This partitioning of edges in PDG is continues recursively ill the leaf node is encountered. Leaf node is any node that does not have any child. The method disclosed herein uses binary tree data structure to store the partitioned edges. The method disclosed herein uses binary tree data structure to store the partitioned edges. The method disclosed uses the data structure in such a way that it can efficiently be converted to an n-ary tree, in case edges fall into more than two classes. Eventually, the binary tree for each function is generated with each node in the tree having two children, left child as (data dependency) and right child as (control dependency) respectively.

b. Node Comparison: This approach finds the similar subgraph by performing a pairwise comparison between the nodes of both the binary tree of mapped functions. To perform pairwise node comparison a pre-order traversal is chosen, with data dependency edge as left child. This comparison and matching is based on the types such as assignment program statement, call program statement etc. (according to the intermediate representation of the static program analysis framework). The similar type of program statements are mapped together and marked as mapped before further mapping. At the end of this step, for each pair of methods mapped vertices are computed. This mapping represents the similar code that exists in a method pair.

There may exist dangling program statements that have no data or control dependency on any of the previous program statements. Henceforth, they do not form a part of our program dependence graph. They produce an independent subgraph beginning with that statement and compared accordingly. Moreover, there is a possibility of missing some program statements that are not captured in the subgraph. For instance, an artifact exists inside exception handling block of code to print some data. Such program statement is called dangling statement and not captured in the PDG. Hence, a scan on function body is required to find dangling roots.

Further, it may be noted that the method disclosed maps two program statement with each other based on the type of program statement like assignments statement, a function call, jumps, etc. In such a case, there exists multiple functions call for mapping, and there is no alternative to get an accurate match. In such scenarios, the method disclosed utilizes a text-based comparison approach.

Once the isomorphic subgraph mapping is performed, at step 212 of the method 200, the processor 104 is configured to compute a function difference between each pair of mapped function. The function difference comprises at least one of:

a. Added part of the code, which is cause of the significant added code smells. The added part of the code is obtained by eliminating matched vertices from the second version.

b. Removed part of the code, which is cause of the significant removed code smells. The removed part of the code is obtained by eliminating the matched vertices of function from the first version The function difference computes added and removed region of the code. The computed function difference is analyzed further to identify root causes of the code smells. The analysis can be performed manually to observe the purpose or causes behind the added code smells and removed code smells. On analyzing those differences, it can be concluded that the causes can be among example list provided below.

1. Cyclomatic Complexity, essentially refers to number of decision points in a code. This code smell is introduced in a program due to more checks on objects, data structure etc. Mostly, it may have got introduced by putting null checks, empty check, directory existence check, data structure size check.

2. Excessive Long Methods, the number of lines exceed than the threshold. This smell may have been introduced essentially because of repetitive blocks of code and excessive use of exception handling.

3. Unused Private Field, when a class member (more particularly, field) is declared as private and not getting used in entire class. This may be due to fact that reference to this variable is removed in subsequent software version, but the declaration still exists.

The method and system disclosed herein has higher usability factor since it provides solution to the primary challenge of the non-availability of fine-grained or statement-level PDG. To work with graph representation of functions, the PDG provided by one of the program analysis frameworks was not suitable to be practiced by the method and system disclosed herein. Furthermore, the existing techniques for code smell analysis are centered on clone detection techniques. However, method disclosed is adaptable to utilize any technique for example clone detection technique to determine the similarity between two functions, however most of the existing techniques in the art are complex to implement in practice. Whereas, on the customized PDG used by the method disclosed performs node to node mapping to find out the similarity of candidate function pair, which has less computational complexity and further provides desired efficient results.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for code analysis to identify causes of code smells, the method comprising:
   detecting, via one or more hardware processors, the code smells in a first version of an application and a second version of the application using a code smell detection technique, wherein the detected code smells in the first version are stored in a first eXtensible Markup Language (XML) file and the detected code smells in the second version are stored in a second XML file;
   comparing, via the one or more hardware processors, the first XML file with the second XML file using a XML-difference technique, to classify each code smell among the detected code smells of the first version and the second version of the application to a category among a plurality of categories, wherein the plurality of categories comprise common code smells, added code smells, and removed code smells, and wherein
      the common code smells are code smells detected in the first version and the second version of the application, and are tagged as least significant code smells;
      the added code smells are code smells detected in the second version and absent in the first version of the application, wherein the added code smells correspond to at least one of new module additions and modifications to existing functions of the first version of the application, wherein the added code smells associated with the modifications to the existing function of the first version of the application are tagged as significant added code smells; and
      the removed code smells are code smells detected in the first version and absent in the second version of the application, wherein the removed code smells correspond to at least one of removal of an existing module and partial removal of code from the existing functions of the first version of the application, wherein the removed code smells associated with the partial removal of code from the existing functions of the first version of the application are tagged as significant removed code smells;
   mapping, via the one or more hardware processors, from the first XML file of the first version and the second XML file of the second version, files that are associated with the significant added code smells or the significant removed code smells to generate a plurality of pairs of mapped functions corresponding to the significant added code smells or the significant removed code smells of the first version and the second version of the application;
   generating, via the one or more hardware processors, a customized Program Dependence Graph (PDG) of each pair among the plurality of pairs of the mapped functions to determine data dependencies and control dependencies for each pair;
   performing, via the one or more hardware processors, an isomorphic sub-graph mapping on the customized PDG of each pair to identify a similar code in a code associated with each pair (210), wherein the isomorphic sub-graph mapping on the customized PDG considers a syntactic structure and data flow of the code associated with each pair to:
      generate an n-ary tree for each mapped function in each pair by performing edge splitting into equivalence classes, wherein each node of each n-ary tree comprises two child nodes with a left child node as data dependency and a right child node as control dependency; and
      perform node comparison and node to node mapping on the generated n-ary trees for each mapped function by comparing corresponding tree vertices to match maximum vertices to determine mapped vertices between the generated n-ary trees; and
   computing, via the one or more hardware processors, a function difference between each mapped function of each pair, wherein the function difference comprises at least one of:
      added part of the code, which is cause of the significant added code smells, wherein the added part of the code is obtained by eliminating matched vertices from the second version; and
      removed part of the code, which is cause of the significant removed code smells, where the removed part of the code is obtained by eliminating the matched vertices of function from the first version, wherein the computed function difference is analyzed further to identify root causes of the code smells.

2. The method of claim 1, wherein the mapping, of the files that are associated with the significant added code smells or the significant removed code smells, is performed at a plurality of granularity levels varying from coarse grained to fine grained.

3. The method of claim 1, wherein the customized PDG is constructed using an Intermediate Representation (IR) of a mapped function associated with each pair, wherein the customized PDG comprises a program statement or predicate as a vertex, edge label as a relation between two vertices of the PDG, a vertex type as tags associated with each vertex describing behavior of each vertex, wherein edges of the PDG depict one of data dependency, control dependency, falls through or combine false through.

4. The method of claim 1, wherein the function difference is analyzed manually to identify root causes of code smells.

5. A system for code analysis to identify causes of code smells, the system comprising:

a memory storing instructions;
one or more input/output (I/O) interfaces; and
one or more hardware processors coupled to the memory via the one or more I/O interfaces, wherein the one or more hardware processors are configured by the instructions to:
   detect the code smells in a first version of an application and a second version of the application using a code smell detection technique, wherein the detected code smells in the first version are stored in a first eXtensible Markup Language (XML) file and the detected code smells in the second version are stored in a second XML file;
   compare the first XML file with second XML file using a XML-difference technique, to classify each code smell among the detected code smells from the first version and the second version of the application to a category among a plurality of categories, wherein the plurality of categories comprise common code smells, added code smells and removed code smells, and wherein
      the common code smells are code smells detected in the first version and the second version, and are tagged as least significant code smells;
      the added code smells are code smells detected in the second version and absent in the first version of the application, wherein the added code smells correspond to at least one of new module additions and modifications to existing functions of the first version of the application, wherein the added code smells associated with the modifications to the existing function of the first version of the application are tagged as significant added code smells; and
      the removed code smells are code smells detected in the first version and absent in the second version of the application, wherein the removed code smells correspond to at least one of removal of an existing module and partial removal of code from the existing functions of the first version of the application, wherein the removed code smells associated with the partial removal of code from the existing functions of the first version of the application are tagged as significant removed code smells;
   map from the first XML file of the first version and the second XML file of the second version, files that are associated with the significant added code smells or the significant removed code smells to generate a plurality of pairs of mapped functions corresponding to the significant added code smells or the significant removed code smells of the first version and the second version of the application;
   generate a customized Program Dependence Graph (PDG) of each pair among the plurality of pairs of the mapped functions to determine data dependencies and control dependencies for each pair;
   perform an isomorphic sub-graph mapping on the customized PDG of each pair to identify a similar code in a code associated with each pair, wherein the isomorphic sub-graph mapping on the customized PDG considers a syntactic structure and data flow of the code associated with each pair to:
      generate n-ary tree for each mapped function in each pair by performing edge splitting into equivalence classes, wherein each node of each n-ary tree comprises two child nodes with a left child node as data dependency and a right child node as control dependency; and
      perform node comparison and node to node mapping on the generated n-ary trees for each mapped function by comparing corresponding tree vertices to match maximum vertices to determine mapped vertices between the generated n-ary trees; and
   compute a function difference between each mapped function of each pair, wherein the function difference comprises at least one of:
      added part of the code, which is cause of the significant added code smells, wherein the added part of the code is obtained by eliminating matched vertices from the second version; and
      removed part of the code, which is cause of the significant removed code smells, where the removed part of the code is obtained by eliminating the matched vertices of function from the first version, wherein the computed function difference is analyzed further to identify root causes of the code smells.

6. The system of claim 5, wherein the one or more hardware processors (104) are configured to map the files, of the files that are associated with the significant added code smells or the significant removed code smells, at a plurality of granularity levels varying from coarse grained to fine grained.

7. The system of claim 5, wherein the one or more hardware processors (104) are configured to construct the customized PDG using an Intermediate Representation (IR) of a mapped function associated with each pair, wherein the customized PDG comprises a program statement or predicate as a vertex, edge label as a relation between two vertices of the PDG, a vertex type as tags associated with each vertex describing behavior of each vertex, wherein edges of the PDG depict one of data dependency, control dependency, falls through or combine false through.

8. The system of claim 5, wherein the function difference is analyzed manually to identify root causes of code smells.

9. One or more one or more non-transitory machine readable information storage media comprising instructions which, when executed by one or more hardware processors, cause the one or more hardware processors to execute a method comprising:
   detecting code smells in a first version of an application and a second version of the application using a code smell detection technique, wherein the detected code smells in the first version are stored in a first eXtensible Markup Language (XML) file and the detected code smells in the second version are stored in a second XML file;
   comparing the first XML file with the second XML file using a XML-difference technique, to classify each code smell among the detected code smells of the first version and the second version of the application to a category among a plurality of categories, wherein the plurality of categories comprise common code smells, added code smells, and removed code smells, and wherein
      the common code smells are code smells detected in the first version and the second version of the application, and are tagged as least significant code smells;
      the added code smells are code smells detected in the second version and absent in the first version of the application, wherein the added code smells correspond to at least one of new module additions and modifications to existing functions of the first version of the application, wherein the added code smells associated with the modifications to the existing function of the first version of the application are tagged as significant added code smells; and the removed code smells are code smells detected in the first version and absent in the second version of the application, wherein the removed code smells correspond to at least one of removal of an existing module and partial removal of code from the existing functions of the first version of the application, wherein the removed code smells associated with the partial removal of code from the existing functions of the first version of the application are tagged as significant removed code smells;

mapping from the first XML file of the first version and the second XML file of the second version, files that are associated with the significant added code smells or the significant removed code smells to generate a plurality of pairs of mapped functions corresponding to the significant added code smells or the significant removed code smells of the first version and the second version of the application;

generating a customized Program Dependence Graph (PDG) of each pair among the plurality of pairs of the mapped functions to determine data dependencies and control dependencies for each pair;

performing an isomorphic sub-graph mapping on the customized PDG of each pair to identify a similar code in a code associated with each pair, wherein the isomorphic sub-graph mapping on the customized PDG considers a syntactic structure and data flow of the code associated with each pair to:

generate an n-ary tree for each mapped function in each pair by performing edge splitting into equivalence classes, wherein each node of each n-ary tree comprises two child nodes with a left child node as data dependency and a right child node as control dependency; and perform node comparison and node to node mapping on the generated n-ary trees for each mapped function by comparing corresponding tree vertices to match maximum vertices to determine mapped vertices between the generated n-ary trees; and computing a function difference between each mapped function of each pair, wherein the function difference comprises at least one of:

added part of the code, which is cause of the significant added code smells, wherein the added part of the code is obtained by eliminating matched vertices from the second version; and removed part of the code, which is cause of the significant removed code smells, where the removed part of the code is obtained by eliminating the matched vertices of function from the first version, wherein the computed function difference is analyzed further to identify root causes of the code smells.

\* \* \* \* \*